US011161266B2

United States Patent
Gates et al.

(10) Patent No.: US 11,161,266 B2
(45) Date of Patent: Nov. 2, 2021

(54) REDUCED WEIGHT MAGNETIC CYLINDER

(71) Applicant: Roto-Die Company, Inc., Eureka, MO (US)

(72) Inventors: George R. Gates, Ballwin, MO (US); Charles E. Schomber, Jr., Catawissa, MO (US)

(73) Assignee: ROTO-DIE COMPANY, INC., St. Louis, MO (US)

( * ) Notice: Subject to any disclaimer, the term of this patent is extended or adjusted under 35 U.S.C. 154(b) by 0 days.

(21) Appl. No.: 17/002,885

(22) Filed: Aug. 26, 2020

(65) Prior Publication Data

US 2021/0060807 A1 Mar. 4, 2021

Related U.S. Application Data

(60) Provisional application No. 62/893,468, filed on Aug. 29, 2019.

(51) Int. Cl.
| B26D 1/147 | (2006.01) |
| B23P 17/00 | (2006.01) |
| F16C 13/00 | (2006.01) |

(52) U.S. Cl.
CPC .............. *B26D 1/147* (2013.01); *B23P 17/00* (2013.01); *F16C 13/00* (2013.01)

(58) Field of Classification Search
CPC .... B26F 1/384; B26F 1/44; B26F 1/38; B26F 1/42; B26F 2001/4463; B23P 17/00; B26D 1/147; F16C 13/00
See application file for complete search history.

(56) References Cited

U.S. PATENT DOCUMENTS 3,217,645 A * 11/1965 Martt ...................... B41F 27/02
                                                         101/415.1
3,897,292 A *  7/1975 Fukuyama .............. B41F 27/02
                                                         156/153
(Continued)

FOREIGN PATENT DOCUMENTS

DE    102019126789 A1 *  4/2021
GB         1261165 A  *  1/1972 ........... H01F 7/0268
(Continued)

OTHER PUBLICATIONS

International Search Report and Written Opinion for PCT/US2020/047921 dated Nov. 9, 2020.
(Continued)

*Primary Examiner* — Jacob J Cigna
(74) *Attorney, Agent, or Firm* — Thompson Coburn LLP

(57) ABSTRACT

A magnetizable cylinder has a cylinder body formed from a magnetizable material with an outer cylindrical surface configured to receive a flexible cutting die. The cylinder body has first and second axial ends spaced apart by the outer cylindrical surface and a hollow interior. First and second journals are joined to the cylinder body with interference fits. At least one of the first and second journals has a weep hole extending through the journal into the hollow interior of the cylinder body. The interference fit of the journals to the cylinder body result from thermal changes of at least one of the first journal, the second journal, and the cylinder body prior to joining the first journal to the cylinder body and the second journal the cylinder body.

17 Claims, 2 Drawing Sheets

(56) References Cited

U.S. PATENT DOCUMENTS

| | | | |
|---|---|---|---|
| 3,919,937 A | 11/1975 | Kostal | |
| 4,715,250 A | 12/1987 | Rosemann | |
| 4,716,827 A | 1/1988 | Wieland et al. | |
| 4,920,630 A * | 5/1990 | Leanna | B41F 27/02 |
| | | | 29/521 |
| 5,189,935 A | 3/1993 | Rosemann | |
| 5,226,344 A | 7/1993 | Rosemann | |
| 5,711,223 A * | 1/1998 | Taylor | B41F 27/02 |
| | | | 101/389.1 |
| 9,683,598 B2 * | 6/2017 | Gusek | C23C 2/003 |
| 2007/0074657 A1 * | 4/2007 | Hamayoshi | F16C 13/00 |
| | | | 118/424 |
| 2017/0100851 A1 | 4/2017 | Midha et al. | |
| 2018/0015628 A1 | 1/2018 | Schomber, Jr. et al. | |

FOREIGN PATENT DOCUMENTS

| | | | |
|---|---|---|---|
| WO | WO-9928552 A1 * | 6/1999 | ........... D21G 1/0233 |
| WO | WO2021078648 A1 * | 4/2021 | |

OTHER PUBLICATIONS

"Shrink-filling", Wikipedia, Retrieved from the Internet Dec. 2, 2020, 1 page.

\* cited by examiner

REDUCED WEIGHT MAGNETIC CYLINDER

RELATED APPLICATION DATA

This application claims the benefit of U.S. provisional application Ser. No. 62/893,468 filed on Aug. 29, 2019, the disclosure of which is incorporated by reference herein.

SUMMARY

This disclosure is directed to a magnetic cylinder used in connection with flexible dies for the converting industry. The magnetic cylinder comprises a magnetizable stainless steel, hollow cylindrical body with hardened steel journals. The construction allows for a significant reduction in weight of the magnetic cylinder in comparison to conventional magnetic cylinders formed from solid stainless steel, while preserving demanding requirements for tolerances of runout tolerances and cylindricity. The magnetic cylinder may be formed by shrink fitting the hollow cylindrical body onto the journals. The magnetic cylinder and journals may meet the requirements for shrink fitting in accordance with ISO S7/h6.

DETAILED DESCRIPTION

Figure 1:
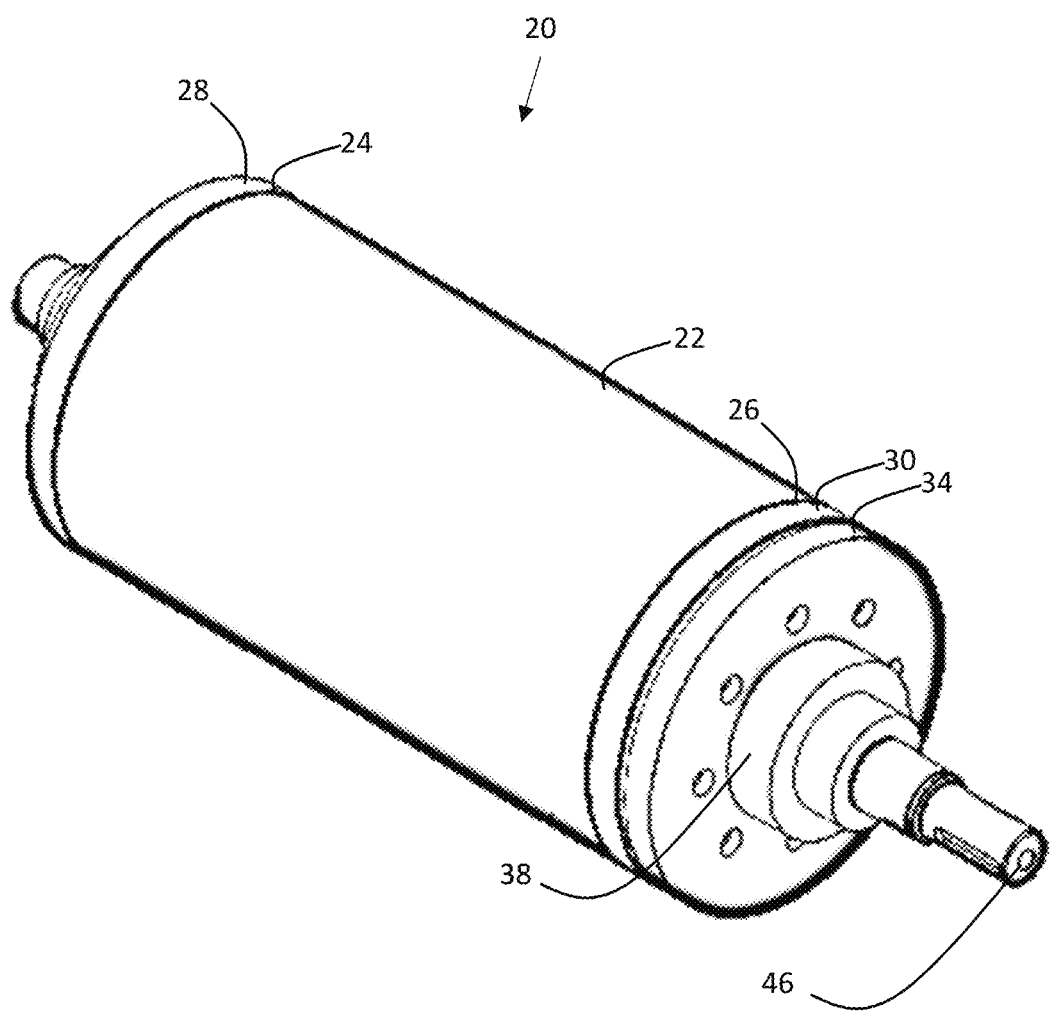
FIG. 1 is a perspective view of an exemplary magnetic cylinder showing journals arranged at opposite axial ends of a magnetic cylinder.
Figure 2:
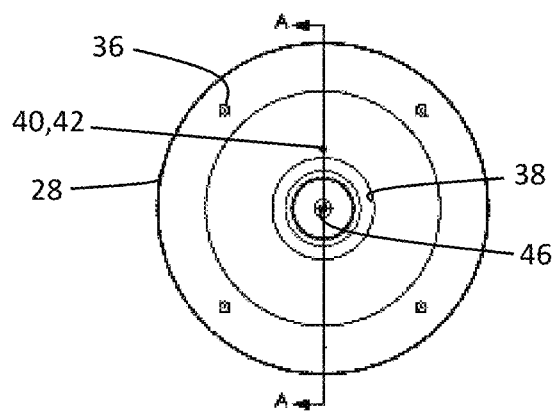
FIG. 2 is an axial end view of the magnetic cylinder of FIG. 1 showing one of the journals.

FIG. 1 shows a magnetizable or magnetic cylinder 20. The magnetic cylinder 20 comprises a hollow cylindrical body 22 with an outer diameter cylindrical surface and opposite axial ends 24,26. The hollow cylindrical body 22 provides a mounting surface for the flexible die (not shown). The hollow cylindrical body 22 may also have an inner diameter cylindrical surface, for instance, a straight bore (e.g, a uniform continuous cross-section) as shown, or other inner diameter surface profile. Journals 28,30 may be arranged at the axial ends 24,26 to support and drive the magnetic cylinder 20 in converting press machinery. The cylindrical body axial ends 24,26 may be configured to receive the journals with an interference fit. The interference fit may be in accordance with ISO S7/h6. The journals 28,30 may be configured to be inserted in the hollow cylindrical body 22 in accordance with ISO S7/h6. As shown in the drawings the inner surface of the cylindrical body has a straight bore that is located on a shoulder 31 formed on an inner face of each journal. Rather than a bore of a uniform, continuous cross section, the cylindrical body may have a counter bore in one or both of its axial ends to receive the shoulder 31 formed on the inner face of the corresponding journal 26,28. The cylinder body 22 may be made from a stainless steel, for instance, a 416 series stainless steel, or another material magnetizable steel. The journals 28,30 may be made from hardened alloy tool steel such as AISI 4150 or D2.

Figure 3:
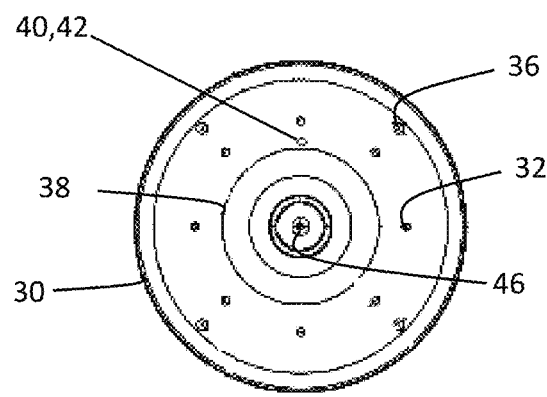
FIG. 3 is an axial end view of the magnetic cylinder of FIG. 1 showing another of the journals that is adapted and configured to receive a spur gear mounted thereto as shown FIG. 1 (the spur gear is removed in FIG. 3 to show details of the journal).
Figure 4:
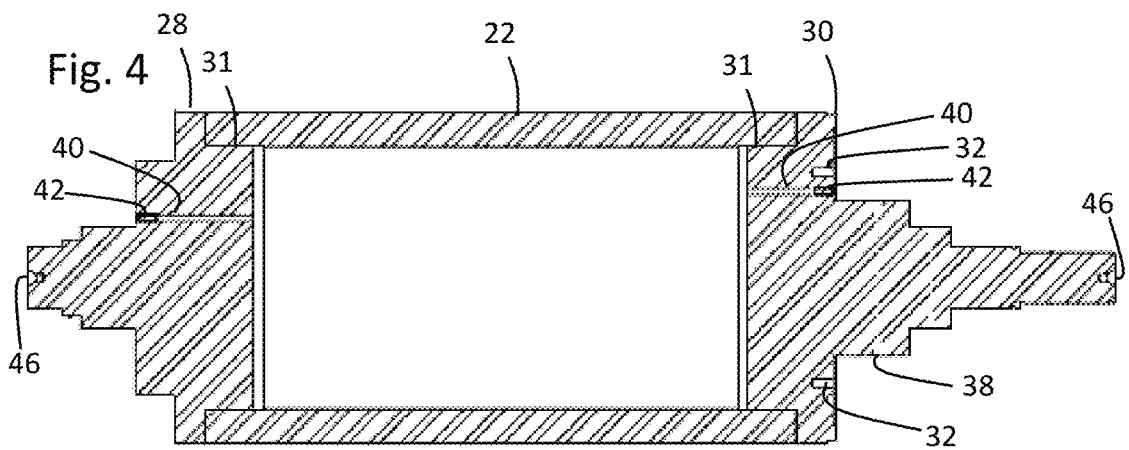
FIG. 4 is a cross-sectional view of the magnetic cylinder of FIG. 1 taken across lines A-A of FIG. 2 (the spur gear is removed in FIG. 4 to show details of the journal).

One or more of the journals 28,30 may have threaded holes 32 to allow attachment of a timing or a spur gear 34 to the journal with one or more mechanical fasteners (not shown). In FIGS. 3 and 4, the spur gear 34 is removed for ease of illustration. The journals 28,30 may also have threaded jackscrew holes 36. Jackscrews (not shown) may be directed through the jackscrew holes 36 to allow disassembly of each of the journals 28,30 from the hollow cylindrical body 20. The journal may be formed with shoulders and other locating surfaces 38 on its outer faces as necessary to support any attached timing or spur gear(s). At least one, and preferably both, of the journals 28,30 includes a weep hole 40 that communicates with the interior of the hollow cylindrical body 22 when the journals are press fit into the axial ends 24,26 of the hollow cylindrical body. A plug 42 may be temporarily inserted in the weep hole, as will be explained below in greater detail. For instance, the weep hole 40 may be threaded to accept a set screw 42 allowing the weep hole to be sealed and opened as desired, as explained below.

In forming the magnetic cylinder, the journals 28,30 are finish ground to specification to receive centers 46, finish the locating shoulder 31 on the inner faces of the journals, finish locating surfaces 38 on the outer faces of the journals for any spur gears 34 t, and to receive the axial ends 24,26 of the hollow cylindrical body 22 with an interference fit in accordance with ISO S7/h6. The hollow cylindrical body 22 has the interior surfaces of its axial ends 24,26 finish ground to receive the journals 28,30 with an interference fit in accordance with ISO S7/h6. Then, prior to installation with the hollow cylindrical body 22, the journals 28,30 are cooled to a surface temperature of approximately −110 degrees Fahrenheit for a period of approximately 15 minutes, and the hollow cylindrical body 22 is heated to a temperature of approximately 300 degrees Fahrenheit. The journals 28,30 are then pressed or slip fitted together with the hollow cylindrical body 22. When the hollow cylindrical body 22 cools to room temperature and the journals 28,30 return to room temperature, the components are held together with an interference fit with an acceptable amount of hoop stress and able to withstand necessary axial displacement forces during operation of the converting equipment.

The weep hole 40 allows pressure inside the interior of the hollow cylindrical body 22 to be relieved during assembly of the journals 28,30 with the cylindrical body. For instance, as the journals 28,30 are pressed onto the axial ends 24,26 of the hollow cylindrical body, the weep hole 40 allows air entrapped in the interior of the hollow cylindrical body 22 to escape. The weep hole(s) 40 may be threaded to accept the set screw 42 so as to allow the weep hole to be sealed after assembly. This allows the magnetic cylinder 20 to undergo any finish machining/grinding/magnetizing operations while preventing any material(s) from entering the interior of the hollow cylindrical body 22 through the weep hole 40 during such finishing processes. The set screw(s) 42 may be removed from the weep hole(s) 40 in the journals 28,30 during normal operation of the converting equipment to equalize pressure between the atmospheric condition in which the converting equipment is location and the hollow interior of the cylindrical body thereby preventing distortion of the magnetic cylinder 20. The effect of distortion may be more pronounced when the converting operations occur at a location with a higher elevation that the location in which the magnetic cylinder was manufactured. While the rate of equalization is dependent upon temperature, barometric pressure, altitude and relative dimensions of the magnetic cylinder and weep hole diameter, the weep hole 40 may be size to accommodate a wide range of these factor and considerations. For instance, the weep hole may be a ANSI 10×32 threaded hole with a diameter of 0.159 inches for an 8 inch nominal diameter magnetic cylinder 20. Such a size accommodates most sizes of magnetic cylinders and operating conditions of converting equipment.

The exemplary magnetic cylinder 20 provides a reduced weight compared to conventional solid magnetic cylinders. This provides many benefits in comparison to conventional solid magnetic cylinders in that the exemplary magnetic cylinder allows for a reduction in cylinder inertia during operation of the converting equipment. This in turn allows for the use of less torque for acceleration and deceleration in the drive system of the converting equipment which in turn allows for lower operating stresses on the converting equipment. Additionally, the exemplary cylinder 20 when compared to similarly sized conventional cylinders reduces the reflective inertial load to the drive system thus providing greater registration control of the die station. All of the benefits are achieved without sacrificing the dimensional and structural integrity of the magnetic cylinder. For instance, for a 8 inch nominal size magnetic cylinder 20, the wall thickness of the cylinder body may be 1 inch which allows for the elimination of a significant amount of weight.

The embodiments were chosen and described in order to best explain the principles of the disclosure and their practical application to thereby enable others skilled in the art to best utilize the disclosed embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A magnetizable cylinder comprising:
    a cylinder body an outer cylindrical surface configured to receive a flexible cutting die, the cylinder body having first and second axial ends spaced apart by the outer cylindrical surface, the cylinder body having a hollow interior, the cylinder body being formed from a magnetizable material; and
    a first journal disposed at the first axial end of the cylinder body, the first journal being joined to the cylinder body with an interference fit;
    a second journal disposed at the second axial end of the cylinder body, the second journal being joined to the cylinder body with an interference fit; and
    wherein at least one of the first and second journals comprises a weep hole extending through the at least one of the first and second journals into the hollow interior of the cylinder body; and
    wherein the interference fit of the first journal to the cylinder body and the interference fit of the second journal the cylinder body result from thermal changes of at least one of the first journal, the second journal, and the cylinder body prior to joining the first journal to the cylinder body and the second journal the cylinder body.

2. The cylinder of claim 1, wherein both the first and second journals comprise weep holes extending through the first and second journals into the hollow interior of the cylinder body.

3. The cylinder of claim 1, wherein the interference fit of the first and second journals with the cylinder body are in accordance with ISO S7/h6.

4. The cylinder of claim 1, further comprising a plug removably attachable to the weep hole.

5. The cylinder of claim 4, wherein the weep hole is threaded and the plug is threadably receivable in the weep hole.

6. The cylinder of claim 1, wherein the cylinder body has an inner surface with a continuous uniform inner diameter cross section.

7. The cylinder of claim 6, wherein the each first and second journals have shoulders on inner faces of the first and second journals, and the inner surface of the cylinder body abuts the shoulders of the first and second journals.

8. A method comprising of manufacturing a magnetizable cylinder:
    providing a cylinder body having an outer cylindrical surface configured to receive a flexible cutting die, wherein the cylinder body has first and second axial ends spaced apart by the outer cylindrical surface, the cylinder body has a hollow interior, and the cylinder body is formed from a magnetizable material;
    providing first and second journals;
    joining the first journal to the first axial end of the cylinder body with an interference fit by changing the temperature of at least one of the first journal and the cylinder body; and
    joining the second journal to the second axial end of the cylinder body with an interference fit by changing the temperature of at least one of the first journal and the cylinder body; and
    wherein the step of providing the first and second journals includes providing at least one of the first and second journals with a weep hole that extends through the at least one of the first and second journals into the hollow interior of the cylinder body when the respective journal is joined to the cylinder body.

9. The method of claim 8, wherein the step of providing the first and second journals includes providing both the first and second journals with weep holes that extend through the first and second journals into the hollow interior of the cylinder body when the journal are joined to the cylinder body.

10. The method of claim 8, wherein:
    the step of providing the cylinder body comprises forming the cylinder body from AISI 410 stainless steel; and
    the step of providing the first and second journals comprises forming the first and second journals from one of AISI 4150 steel and AISI D2 steel.

11. The method of claim 8, wherein the step of providing a cylinder body comprises providing a cylinder body with an inner surface having a continuous, uniform inner diameter cross section.

12. The method of claim 11, wherein:
    the step of providing first and second journals includes providing the first and second journals with shoulders on inner faces of the first and second journals, and
    the step of joining the first journal to the first axial end of the cylinder body with the interference fit includes arranging the inner surface of the cylinder body to abut the shoulder of the first journal; and the step of joining the second journal to the second axial end of the cylinder body with the interference fit includes arranging the inner surface of the cylinder body to abut the shoulder of the second journal.

13. The method of claim 8, wherein:

the step of joining the first journal to the first axial end of the cylinder body with the interference fit includes providing the interference fit of the first journal with the cylinder body in accordance with ISO S7/h6; and the step of joining the second journal to the second axial end of the cylinder body with the interference fit includes providing the interference fit of the second journal with the cylinder body in accordance with ISO S7/h6.

14. The method of claim 13 wherein:

the step of joining the first journal to the first axial end of the cylinder body with the interference fit includes cooling the first journal to about −110 degrees Fahrenheit for a period of about 15 minutes while heating the cylinder body to about 300 degrees Fahrenheit; and the step of joining the second journal to the second axial end of the cylinder body with the interference fit includes cooling the second journal to about −110 degrees Fahrenheit for a period of about 15 minutes while heating the cylinder body to about 300 degrees Fahrenheit.

15. The method of claim 8, further comprising inserting a removable plug in the weep hole to prevent material from entering the hollow interior of the cylinder body.

16. The method of claim 15, further comprising removing the removable plug from the weep hole prior to normal operation of the magnetizable cylinder in a converting line.

17. The method of claim 15, wherein the step of inserting the removable plug in the weep hole comprises threading the removable plug into the weep hole.

\* \* \* \* \*